United States Patent
Dennis et al.

(10) Patent No.: US 6,422,854 B1
(45) Date of Patent: Jul. 23, 2002

(54) ROTARY CUTTER FOR CUTTING, MEASURING, AND DISPENSING MOLTEN PLASTIC

(75) Inventors: Michael D. Dennis, Longview, IL (US); Karl Zemlin, Indianapolis, IN (US); Michael Albertson, Brownsburg, IN (US); Larry M. Zepf; Gayle L. Johnson, both of Crawfordsville, IN (US)

(73) Assignee: Alcoa Closure Systems International, Crawfordsville, IN (US)

( * ) Notice: Subject to any disclaimer, the term of this patent is extended or adjusted under 35 U.S.C. 154(b) by 0 days.

(21) Appl. No.: 09/444,936

(22) Filed: Nov. 22, 1999

(51) Int. Cl.$^7$ .............................. B26D 1/12; B29B 9/06
(52) U.S. Cl. ...................................... 425/311; 425/437
(58) Field of Search ................... 425/311, 809, 425/437; 264/294; 83/98, 99, 123

(56) References Cited

U.S. PATENT DOCUMENTS

| | | | |
|---|---|---|---|
| 3,414,938 A | 12/1968 | Caviglia | 425/114 |
| 3,561,372 A | * 2/1971 | Vogt | 425/100 |
| 3,825,044 A | 7/1974 | Lidikay et al. | 141/187 |
| 3,955,605 A | 5/1976 | Zupan | 141/1 |
| 4,080,136 A | 3/1978 | Peller | 425/295 |
| 4,640,673 A | * 2/1987 | Takeda et al. | 425/297 |
| 5,292,240 A | * 3/1994 | Capelle | 425/142 |
| 5,596,251 A | 1/1997 | Miller | 318/366 |
| 5,603,964 A | * 2/1997 | Rote et al. | 425/110 |
| 5,641,522 A | * 6/1997 | Santanovsky | 425/72.1 |
| 5,807,592 A | 9/1998 | Alieri | 425/347 |
| 5,866,177 A | 2/1999 | Ingram | 425/297 |

* cited by examiner

*Primary Examiner*—James P. Mackey
*Assistant Examiner*—Donald Heckenberg
(74) *Attorney, Agent, or Firm*—Stephen D. Geimer; Edward L. Levine

(57) ABSTRACT

A rotary cutter separates a molten plastic pellet from a nozzle and deposits the molten plastic pellet into a mold of a mold cavity. The cutter blade includes a cutter blade and a cutter shaft rotatable about an axis of the shaft. The cutter blade is mounted to extend radially from an end of the shaft, the shaft positionable adjacent the nozzle such that the rotary path of the cutter blade closely conforms to a facing surface of the nozzle. An air conduit extends through the cutter shaft to the cutter blade. An air orifice in communication with the air conduit is oriented to direct a stream of air radially along the cutter blade to displace a molten plastic pellet from the cutter blade with a stream of pressurized air. The delivery of pressurized air is precisely timed to displace the pellet from the cutter blade and into the mold cavity.

5 Claims, 7 Drawing Sheets

ROTARY CUTTER FOR CUTTING, MEASURING, AND DISPENSING MOLTEN PLASTIC

TECHNICAL FIELD OF THE INVENTION

The present invention relates generally to a method and apparatus for cutting discrete quantities of molten plastic material from a supply of the molten plastic material for subsequent compression molding of the discrete quantities of material. More particularly, the invention relates to a cutter which rotates relative to a molten plastic delivery nozzle to cut a pellet of molten plastic from the nozzle and then carries and ejects the pellet of molten plastic into a cavity for compression molding articles therefrom.

BACKGROUND OF THE INVENTION

U.S. Pat. No. 4,277,431, to Peller, hereby incorporated by reference, discloses an apparatus for cutting discrete quantities or pellets of molten plastic material for subsequent placement in respective mold cavities. This apparatus is particularly suited for use in the manufacture of closures by compression molding, including the formation of compression molded closure shells, and the formation of compression molded liners within associated closure shells. U.S. Pat. Nos. 4,343,754 to Wilde et al., and 4,497,765 to Wilde et al., both hereby incorporated by reference, disclose compression molding of threaded, tamper-indicating plastic closures, and compression molding of liners in such closures, for which manufacturing processes the apparatus of the above U.S. Pat. No. 4,277,431 is suited for use.

The apparatus of U.S. Pat. No. 4,277,431 includes a nozzle through which molten plastic material is delivered from an associated extruder or the like, and a rotatably driven cutting blade which is rotated with respect to the nozzle. As plastic is extruded from the nozzle, a discrete quantity or pellet of plastic material is cut during each rotation of the associated cutting blade. Immediately thereafter, the severed plastic pellet is moved from the face of the nozzle by the cutting blade for delivery to a respective mold cavity. The mold cavity may comprise either a female mold die for formation of a closure shell by compression molding, or a closure shell within which the molten plastic is compression molded for formation of a sealing liner.

Notably, the cutter apparatus of the above patent is configured to facilitate separation of each plastic pellet from the cutting blade by creating a slight mechanical interference between the cutting blade and the face of the associated nozzle. Thus, as the cutting blade rotates with respect to the nozzle, the blade is flexed or deflected as it engages the nozzle face and severs the extruded plastic material. As the blade continues to rotate, with the severed plastic material carried on the flexed surface of the cutting blade, the cutting blade disengages the face of the nozzle, thereby rapidly accelerating the pellet to facilitate its separation from the blade and delivery of the pellet to one of the associated cavities. This cutting and subsequent "flicking" like action of the cutting blade is sometimes referred to as the "cut-and-flip" portion of each cutting cycle.

The above patent contemplates that the disclosed cutting apparatus be mechanically-driven from the associated molding apparatus, thus effecting the desired synchronous operation of the cutter. However, it will be appreciated that increases or decreases in production speed necessarily result in corresponding variation in the "cut-and-flip" portion of the cutting cycle, which can create undesirable variability in the speed, direction, rotational velocity, and orientation of the plastic pellet as it is delivered to the associated cavity. This can, in turn, create problems regarding pellet placement, orientation, and an undesirable tendency of the pellet to bounce upon delivery into the associated cavity.

U.S. Pat. No. 5,596,251 describes a cutter apparatus driven by a servo motor, the operation of which is coordinated with an associated rotary carousel on which cavities are successively presented to the cutter apparatus. In order to effect separation of each discrete quantity of plastic material from the cutting blade of the cutter apparatus, the servo motor is operated to create a period of distinct deceleration during each rotary cutting cycle, thereby separating the molten plastic from the surface of the cutting blade.

The present inventors have recognized that it would be desirable to provide a cutter apparatus for cutting molten plastic pellets from a source of molten plastic material and placing the pellets into successive cavities for compression molding which could be effectively operated at a high rate of speed, which reduces the need to replace worn cutter blades, and which reliably operates to produce a high rate of flawlessly molded articles.

SUMMARY OF THE INVENTION

The present invention is directed to a plastic pellet cutting system particularly suited for use in compression molding of plastic closure shells, and plastic liners in closure shells. The present invention contemplates a rotating cutting blade operated in conjunction with a molten plastic delivery nozzle to separate plastic pellets from a face of the nozzle. The present system utilizes a cutting blade operated at zero interference (or with slight clearance) with the associated nozzle face, wherein the cutting blade has associated therewith an air driven pellet ejection system. The ejection system uses pressurized air to displace a pellet carried by the blade into a molding cavity.

The present system avoids the need to create mechanical interference between a cutting blade and an associated nozzle face to facilitate separation of each molten plastic pellet from the cutting blade.

In one embodiment, the cutting blade has associated therewith an air activated plunger which reciprocates radially in close proximity to the cutting blade to push a pellet from the blade. The plunger can be assisted by a high velocity stream of air directed at the pellet held on the cutting blade to dislodge the pellet from the cutting blade to deliver the pellet into the molding cavity.

In another embodiment, no plunger is used. The cutting blade has associated therewith an air delivery system which directs a high velocity stream of air at the pellet held on the cutting blade to dislodge the pellet from the cutting blade to deliver the pellet into a molding cavity.

The present system is used in conjunction with a rotary compression molding apparatus, which typically includes a rotating carousel or turret which carries cavities in the form of mold dies or closure shells. The present system effects delivery of discrete quantities of molten plastic material (i.e., plastic pellets) to the series of moving cavities by the provision of an extruder or like apparatus which provides a source of molten plastic material to a nozzle. A cutting blade is driven with respect to the nozzle so that attendant to each rotation of the blade, the blade cuts a discrete quantity or pellet of plastic material as it is being extruded.

The delivery of each molten plastic pellet is effected without significant flexure of the cutting blade, thus obviating the need for mechanical interference between the cutting blade and the nozzle face, as in arrangements heretofore known.

The present invention contemplates a two-piece cutter assembly mounted on a cutter shaft, the cutter shaft being rotated about its axis by a motor. The two-piece cutter assembly comprises a cutter body which is held substantially within a radial bore formed in a distal end portion of the cutter shaft, and a protruding cutter head extending from the cutter body. The cutter shaft includes an internal air passage for pressurized air delivery to the cutter body, and internal cooling channels for passing cooling fluid, such as cooling water, to and from the cutter body for maintaining the cutter body at a desired temperature during operation. The cutter assembly includes a series of air apertures directed toward an internal region of the cutter head for passing pressurized air into the cutter head to dislodge a plastic pellet held thereby, during operation. The air apertures are in flow communication with the internal air passage within the cutter shaft. The air apertures can be located on a plate stationary to the cutter body or on a reciprocating plunger. The internal cooling channels through the cutter shaft are in flow communication with an arcuate area between the cutter body and an inside wall of the radial bore within the cutter shaft.

The cutter shaft is rotated within a rotary union block. The cutter shaft includes a first arcuate channel around its circumference which is in flow communication with the internal air passage. The cutter shaft also includes second and third arcuate channels around its circumference which are in flow communication with the two internal cooling channels, respectively. The rotary union block includes corresponding channels or passages in flow communication with the first, second and third arcuate channels of the cutter shaft, such that pressurized air and cooling water can be sealingly transferred between the rotary union block and the cutter shaft given that the cutter shaft is rotating and the union block is stationary. A precision servo motor drives the cutter shaft via a timing belt and sprocket arrangement.

In operation, the cutter shaft is rotated such that the cutter head sweeps across the nozzle face to cut and carry a molten plastic pellet. At a preselected position in the rotary travel of the cutter head, a stream of pressurized air acts against the plastic pellet either directly and/or via a plunger to dislodge the pellet from the cutter head and into a compression molding cavity.

The preselected rotary position of the cutter head can be defined by the location and circumferential extent of air channels or passages in the rotary union block. Alternatively, the timing of the air delivery of pressurized air into the cutter head can be controlled by a programmable logic controller (PLC).

The invention provides advantages over the prior apparatus. The invention will reduce the probability of broken cutter blades due to fatigue and interference with the nozzle face. The invention will provide more consistent and accurate pellet placement in the compression mold. It is contemplated that the invention will reduce (stringing) of molten plastic during operation, and also decrease a pellet weight standard deviation. It is contemplated that the invention will result in reduced cutter and nozzle face wear and reduced maintenance requirements. Setup time for the apparatus should be decreased and apparatus reliability increased.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
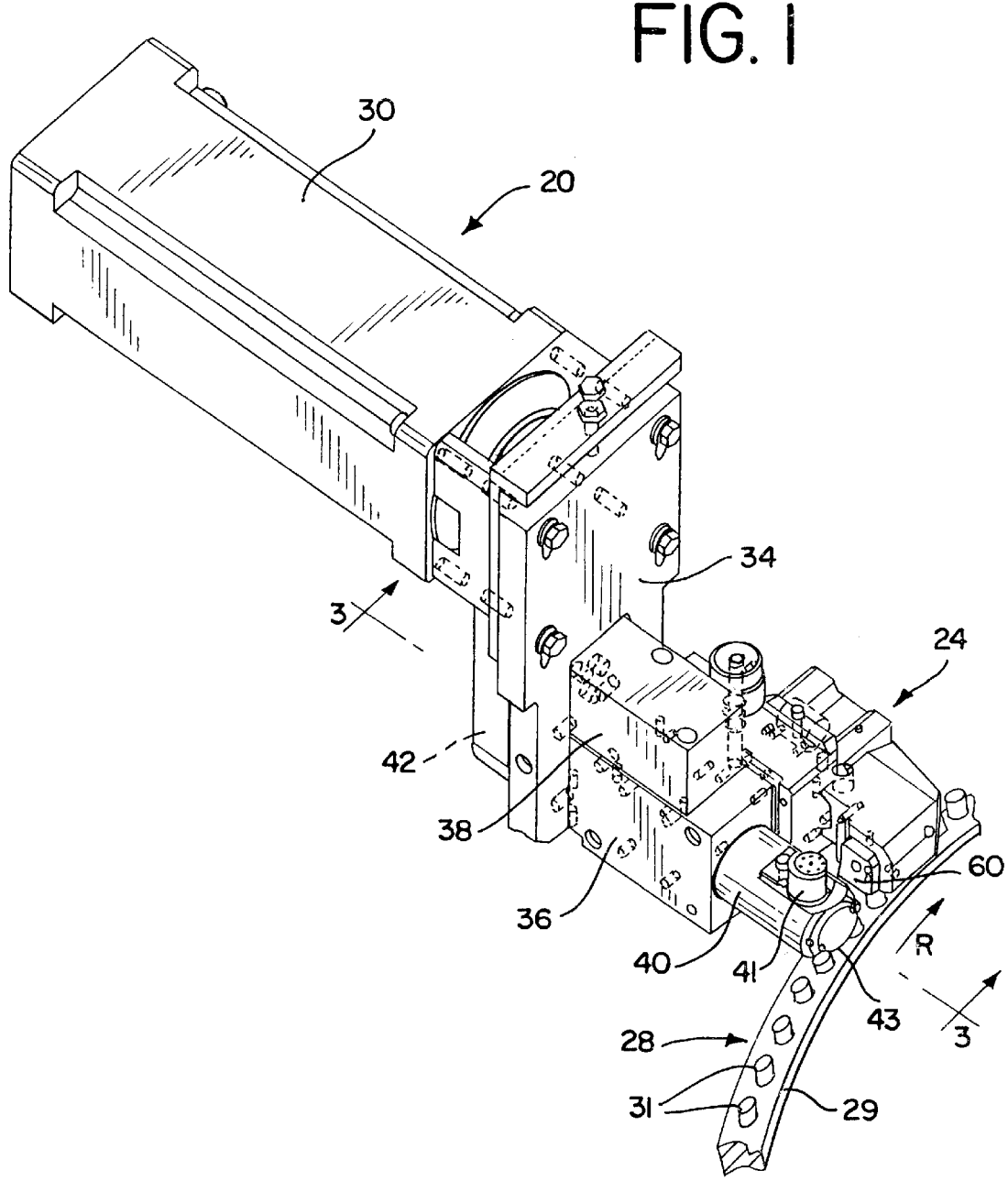
FIG. 1 is a perspective view of a cutter apparatus associated with a nozzle which provides a source of molten plastic material.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

FIG. 1 illustrates a cutter apparatus 20 associated with a molten plastic delivery apparatus 24 and a molding carousel apparatus 28. A precision servo motor 30 is mounted via a bracket 34 to a rotary union block 36 and to an air manifold block 38. A cutter shaft 40 axially penetrates the rotary union block 36, extending from a base end 42 located behind the bracket 34 to a distal end 43. A cutter assembly 41 is located adjacent to the distal end 43.

The carousel apparatus 28 is shown in fragmentary fashion. The carousel apparatus 28 includes an annular support 29 which carries a plurality of molding cavities 31 arranged in a circle. The carousel apparatus 28 is rotated in the direction R about a vertical centerline thereof. The cavities could be, for example, molding dies for forming bottle caps or shells, or bottle caps or shells for forming liners therein.

In operation, the rotating cutter assembly 41 cuts plastic pellets from a nozzle 60 of the molten plastic delivery apparatus 24, and deposits the pellets into successive cavities 31 carried on the rotating carousel apparatus 28. The pellets can then be compression molded within the cavities and thereafter removed as finished articles.

Figure 2:
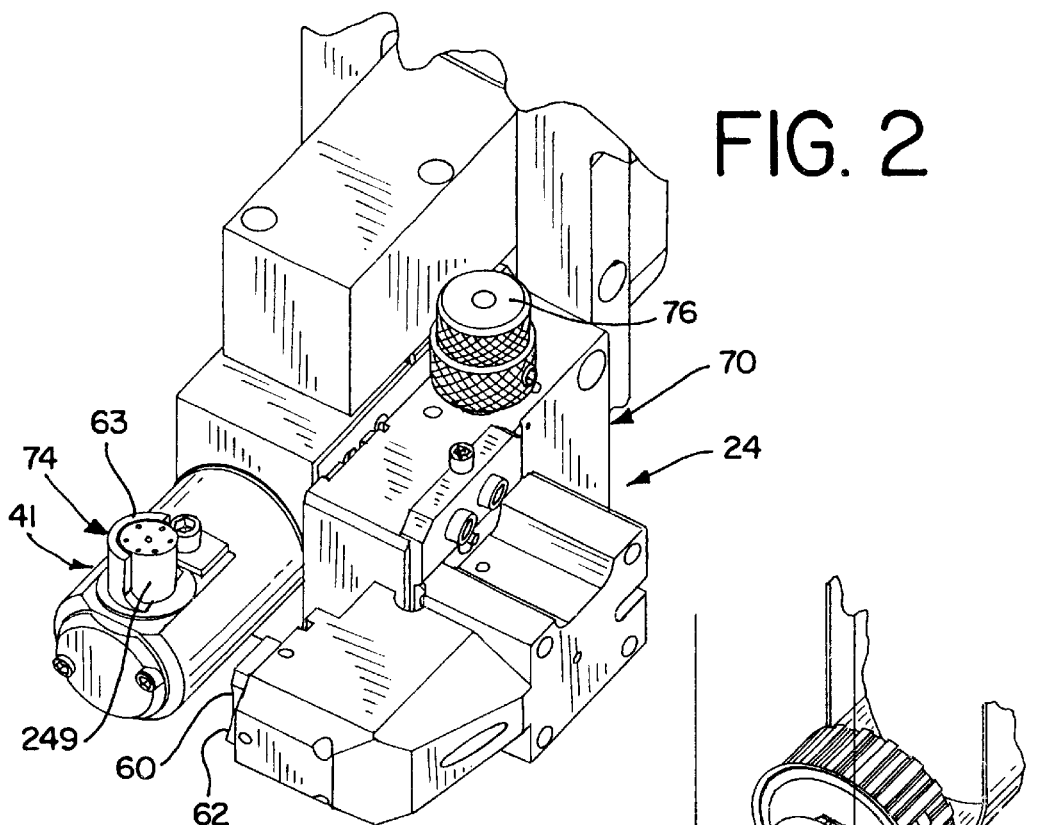
FIG. 2 is a fragmentary enlarged perspective view of a portion of the apparatus shown in FIG. 1.

As illustrated in FIG. 2 the molten plastic delivery nozzle 60 faces the cutter assembly 41 and provides a nozzle face 62 having an arcuate surface for closely conforming to a circular path of an extremity 63 of a cutter blade 74. A relative position adjustment block 70 is used to set the precise and exact relative position between the nozzle 60 and the cutter blade 74. The adjustment block 70 includes micrometer-like adjustment knobs 76, for precisely setting the spacing of, or clearance between, the nozzle 60 with respect to the moving cutter blade 74.

Figure 3:
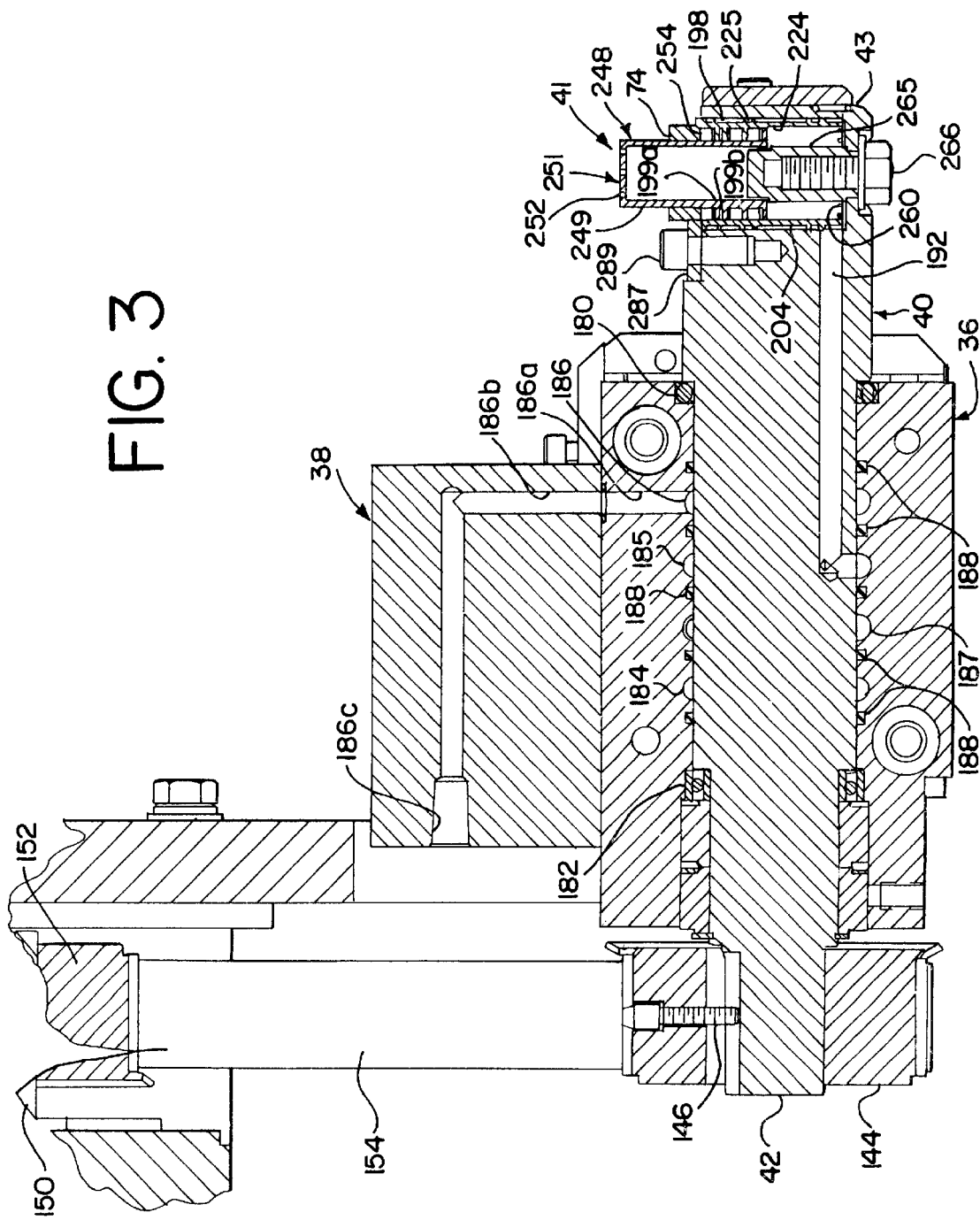
FIG. 3 is a fragmentary sectional view taken generally along line 3—3 from FIG. 1.
Figure 5:
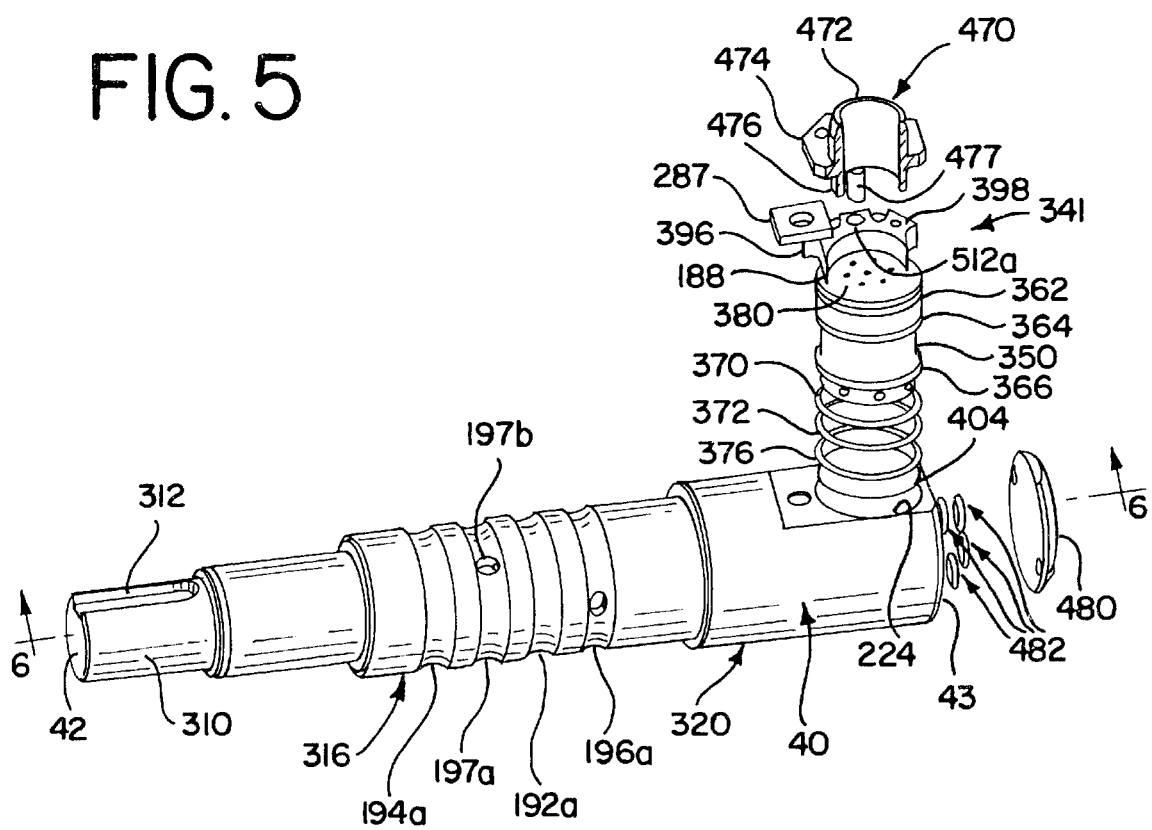
FIG. 5 is an exploded perspective view of an alternate cutter shaft and cutter assembly.

As shown in FIG. 3, a driven pulley 144 is locked to the base end 42 of the cutter shaft 40 by a recessed set screw 146. The precision servo motor 30 includes an output shaft 150 upon which is locked a drive pulley 152. A belt 154 wraps around the drive pulley 152 and the driven pulley 144 to cause conjoint rotation of the pulleys 152, 144. The belt 154 and the pulleys 144, 152 can be toothed for precise, no-slip rotation of the pulleys.

FIG. 3 illustrates the cutter shaft 40 being rotatably supported within the rotary union block 36 by front and rear bearings 180, 182 respectively. Arranged between an inside surface of the rotary union block 36 and the shaft 40 are a first arcuate channel 184, a second arcuate channel 185, and a third arcuate channel 186, and a fourth arcuate channel 187 arranged alternatively between O-ring seals 188.

The cutter shaft 40 includes arcuate and axial channels for transferring air and cooling fluid between the union block 36 and the cutter assembly 41. The layout of those channels is more completely described below with regard to the embodiment described in FIGS. 6 through 8.

Figure 8:
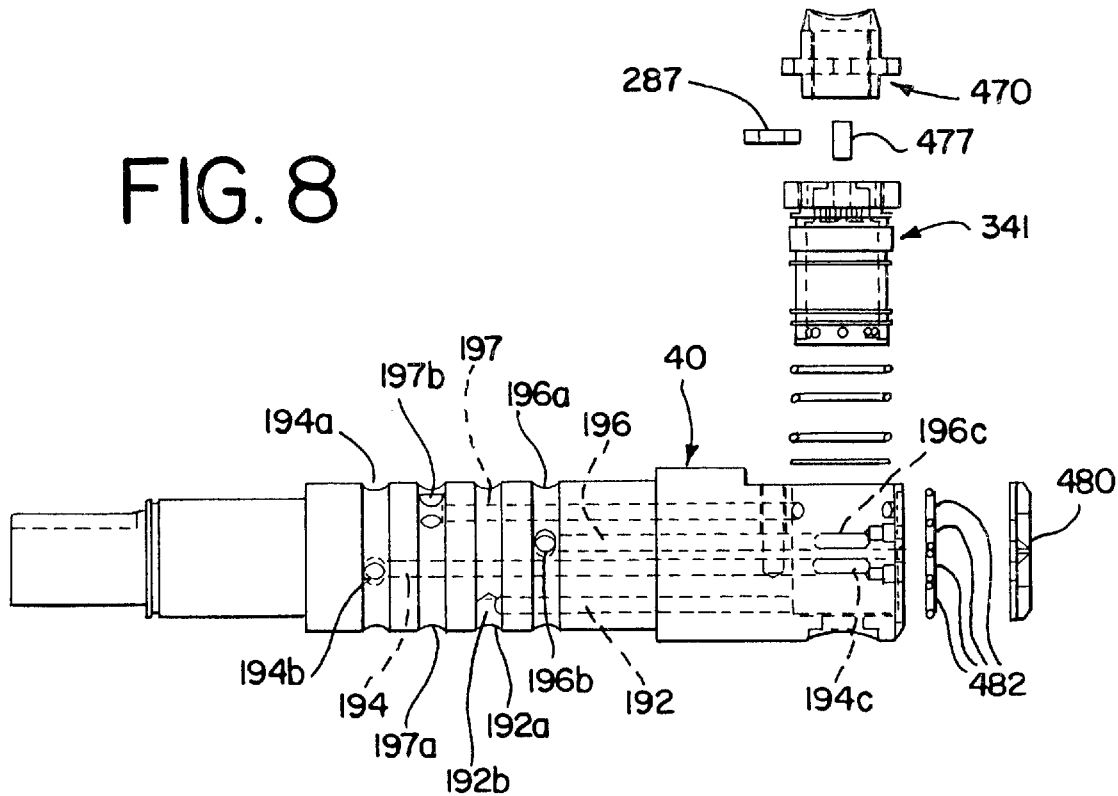
FIG. 8 is an exploded elevational view of the apparatus shown in FIG. 5.

An axial, internal air passage 192 within the shaft 40 is in flow communication with the cutter assembly 41 and the second arcuate channel 185. An axial cooling fluid channel 194 within the cutter shaft is in flow communication with the cutter assembly 41 and the first arcuate channel 184 via an arcuate channel 194a and a radial channel 194b in the shaft, as shown in FIG. 8. A second axial cooling fluid channel 196 within the shaft 40 is in flow communication with the cutter assembly 41 and the third arcuate channel 186 via an arcuate channel 196a and a radial channel 196b in the shaft, as shown in FIG. 8. The arcuate channels 184, 186 are preferably annular. The axial channels 194, 196 are used to transport cooling water to and from the cutter assembly 41 to maintain the cutter temperature at a preselected temperature to keep the molten plastic in an acceptable molten state during operation.

A first vertical channel 186a extends from the arcuate channel 186, through the rotary union block 36, and flow connects to an L-shaped channel 186b through the manifold block 38, which channel 186b terminates in a tube connection port 186c. The other arcuate channels 184, 185, 187 are routed to tube connections at the manifold block, adjacent the connection 186c, in the same or similar fashion (not shown).

According to the embodiment of FIG. 3, a cutter body portion 204 is sealed to the inside surface of a radial bore 224 in the shaft 40 by a plurality of O-rings 225. A plunger 248 is reciprocably held within the body portion 204. The cutter blade 74 is formed with the body portion 204. The plunger 248 includes a plurality (three shown) of packing rings 254 spaced apart along an axial length of the plunger 248. The cutter blade 74 has a semicircular cross section sized to receive a cylindrical extending portion 249 of the plunger 248, when the plunger is extended. The extending portion 249 has a circular perforated end face 251 having perforations 252.

The body portion 204 includes a plurality of openings 260 which permit air to be communicated between an inside of the body portion 204 and the radial bore 224. When compressed air is introduced into the axial channel 192, into the radial bore 224, through the openings 260, and into the body portion 204, the plunger 248 is driven by air pressure to its extended position. The end face 251 pushes a plastic pellet from the blade 74. Air flowing through the perforations 252 in the end face 251 also assists in ejecting the plastic pellet.

To retract the plunger, in a direction downwardly according to FIG. 3, the axial channel 192 can be vented through the corresponding channels of the rotary union and the manifold block while pressurized air is delivered to an elevated position between the plunger and the body portion to drive the plunger downwardly. To this end, the fourth arcuate channel 187 is provided between an inside surface of the rotary union block 36, which channel 187 is flow connected to a source of pressurized air through the manifold block 38. The arcuate channel 187 is open to an arcuate channel 197a formed on the shaft 40, shown in FIG. 8. The arcuate channel 197a is open to a radial channel 197b which is open to an axial channel 197 within the shaft 40. The axial channel 197 is open to an annular space 198 located between an inwardly directed radial flange 199a of the body portion 204 and an outwardly directed radial flange 199b of the plunger 248. Air pressure injected into this annular space acts to drive the plunger downwardly.

The circumferential extent, i.e. whether the arcuate channel is completely annular over 360 degrees or exists only over a portion of the 360 degrees, and the relative angular location of the arcuate channels 187, 197a and the arcuate channels 185, 192a can be designed to apply synchronized pressurization to upper and lower portions of the plunger to vertically reciprocate the plunger to eject a pellet and then be retracted for the blade to receive the next pellet. Alternatively, the arcuate channels 187, 197a and 185, 192a are completely annular over 360 degrees of the shaft outside surface and the rotary union inside surface and a controller can be used to synchronize the injection of pressurized air into, or the venting of air from, the manifold block ports corresponding to the two channels 185, 187 of the rotary union.

Alternatively, rather than applying air into the channel 198, a vacuum can be applied via the air conduit 192 to draw the extending portion 249 of the plunger back into the body portion 204. As a further alternative, a return spring could be placed between the body portion and the plunger to retract the plunger.

The cutter assembly 41 is held to the shaft 40 by use of a hold down plate 287 which is fastened by a cap screw 289 to the shaft 40. The hold down plate clamps a shoulder of the body portion 204 to the shaft 40. Also, the plunger 248 is guided for reciprocating movement by a central plug member 265 which is fixed in position by a bolt 266. The bolt 266 penetrates a hole in the shaft 40 and is threadedly engaged into a threaded bore of the plug member 265.

Figure 4:
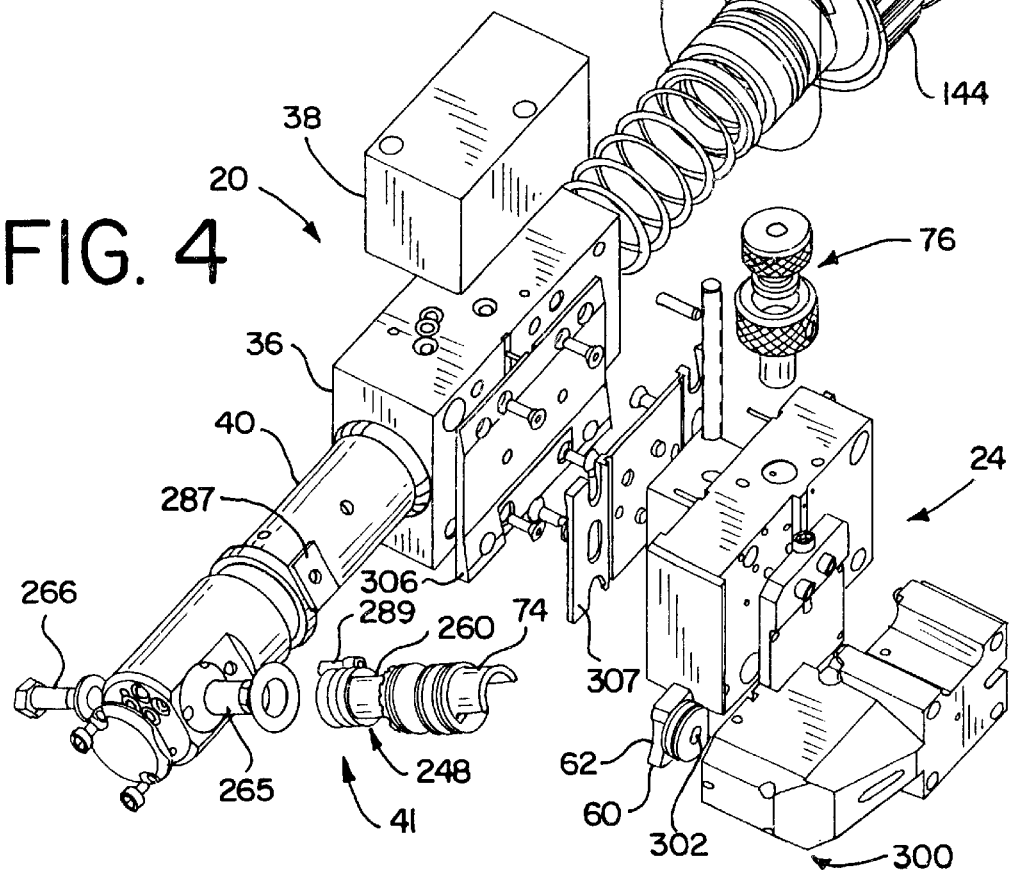
FIG. 4 is an exploded perspective view of the apparatus shown in FIG. 2.

FIG. 4 illustrates the cutter apparatus 20 and the molten plastic delivery apparatus 24 in exploded view. The molten plastic delivery apparatus 24 includes a nozzle block 300 which receives molten plastic into an inlet (not shown) and dispenses the molten plastic through a central aperture 302 of the nozzle 60. Adjustment of the position of the nozzle face 62 with respect to the cutter blade 74 is accomplished by turning the adjustment knob 76. Horizontal adjustment wedges 306, 307 slide vertically relative to each other, to finely adjust the horizontal clearance between the nozzle face 62 and the cutter blade 74.

FIGS. 5 through 8 illustrate the cutter shaft 40 having a back end portion 310 adjacent to the base end 42 with a keyway 312 for excepting the set screw 146 for locking the shaft 40 to the driven pulley 144. The cutter shaft 40 includes an intermediate diameter section 316 having the plurality of arcuate channels 192a, 194a, 196a, 197a which flow connect, via short radial passages 192b, 194b, 196b, 197b, the axial channels 192, 194, 196, 197 with the channels or passages 184, 185, 186, 187 respectively within the rotary union block 36 (also see FIGS. 6 and 8). The channels 197, 197a, 197b, 187 are not used in the embodiment of FIGS. 5 through 11 but are used in the embodiment of FIGS. 1 through 4.

On a front side of the intermediate diameter section 316 is a large diameter section 320, larger in diameter than the intermediate diameter section 316. Within the large diameter section 320 the radial bore 224 extends perpendicularly to the axis of the shaft 40. An alternate cutter assembly 341 is partly held within the radial bore 224. The cutter assembly 341 includes a tubular body portion 350. The tubular body portion 350 has three circumferential grooves 362, 364, 366 for holding three O-rings 370, 372, 376 respectively. The body portion 350 includes on a distal end thereof a perforated plate 380 having a plurality of air orifices 382. A substantially semicircular frame 396 extends upwardly from the perforated plate 380 and includes a flange portion 398 having connection holes therein. An end bumper 404 is arranged below the body portion 350. The end bumper 404 is in the form of a solid circular plate.

A cutter head 470 includes a semicircular blade 472, an intermediate semicircular flange 474 and a neck portion 476. When assembled, the neck portion 476 fits within the semicircular frame 396 and the intermediate flange 474 sets onto the flange portion 398. A tapered pin 477 and one or more machine screws connect the cutter head intermediate flange 474 to the cutter body flange portion 398.

On the distal end 43 of the cutter shaft 40 is a shaft end cap 480 and a plurality of small O-rings 482 which, when assembled, act to close the axial channels 192, 194, 196, 197 which can be drilled from the axial distal end 43 of the shaft during manufacture thereof.

Figure 6:
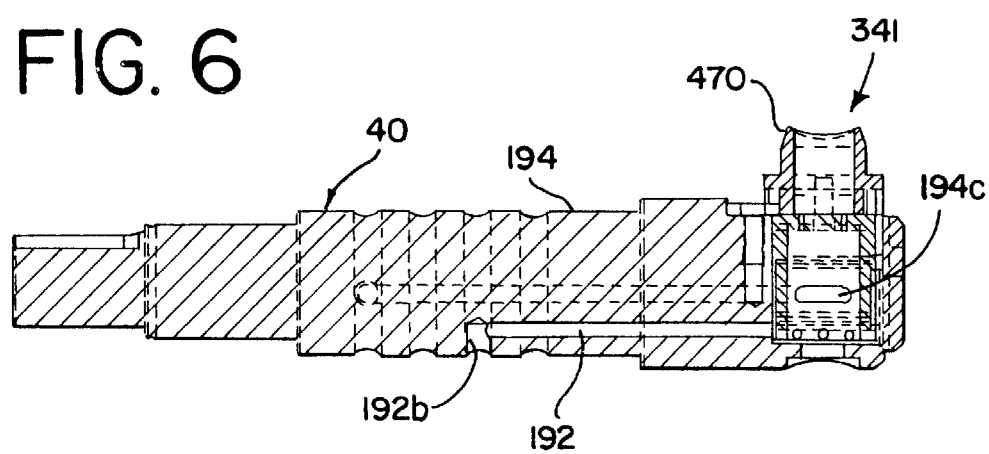
FIG. 6 is a sectional view taken generally along line 6—6 of FIG. 5.
Figure 7:
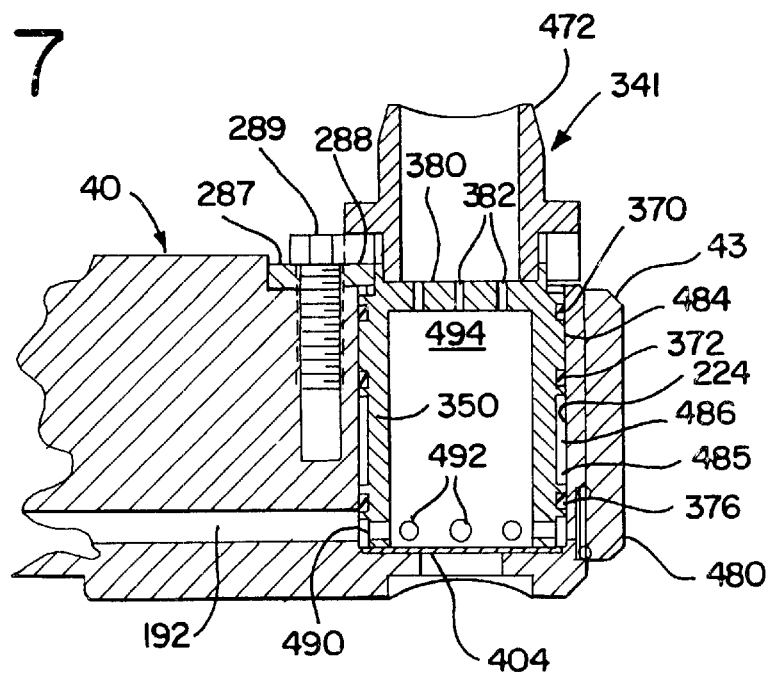
FIG. 7 is a fragmentary enlarged sectional view taken from FIG. 6.

FIGS. 6 and 7 illustrate the fitting relationship of the cutter assembly 341 into the shaft 40. The cutter assembly 341 fits within the radial bore 224 in the shaft 40. The body portion 350 includes upper and lower annular raised regions 484, 485 respectively. The raised regions 484, 485 are sealed to the inside surface of the radial bore 224 by the O-rings 370, 372, 376. An annular space 486 for circulating cooling fluid is located between the raised regions 484, 485.

The hold down plate 287 is used to capture an edge 488 of the body portion 350 to hold the body portion 350 onto the shaft 40. Below the O-ring 376 is an annular space 490 between an inside of the bore 224 and an outside of the body portion 350. The annular space 490 is in flow communication with the axial channel 192. The body portion 350 includes radial openings 492 spaced around the circumference of the body portion that flow connect an inside of the body portion to the annular space 490. Thus, air can flow from the manifold block 38, through the union block 36, through the arcuate channel 184 (FIG. 3), through the arcuate channel 194a, through the radial channel 194b (FIG. 8), through the axial channel 192, through the annular space 490, through the openings 492, through the volume 494, and out of the apertures 382.

Cooling fluid can flow from the manifold block 38, through the rotary union 36, through the arcuate channel 184, through the arcuate channel 194a, through the radial channel 194b, through the axial channel 194, through the annular space 486, and out through the axial channel 196, through the radial channel 196b, through the arcuate channel 196a, through the arcuate channel 186, through the rotary union 36, and out through the manifold block 38. The axial channels 194, 196 open up into the bore 224 at elongated orifices 194c, 196c respectively. The orifices 194c, 196c are open into the annular space 486.

Figure 9:
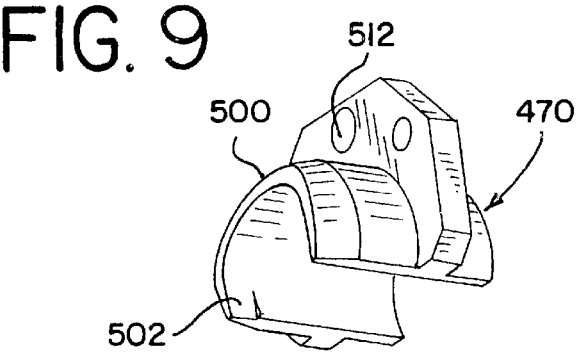
FIG. 9 is an enlarged perspective view of a portion of the apparatus shown in FIG. 8.
Figure 10:
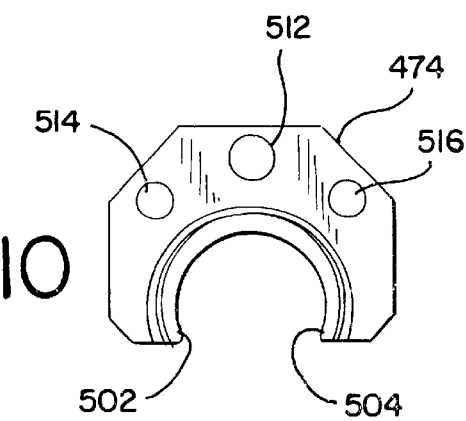
FIG. 10 is a front view of the portion shown in FIG. 9.

FIGS. 9 and 10 illustrate in detail the structure of the cutter head 470 of the invention. The leading edge 500 of the blade includes tapered or relief areas 502, 504 on opposite lateral leading edges of the blade 472. These relief areas 502, 504 help to prevent the pellet from sticking on the blade. The intermediate flange 474 includes one large through hole 512 for receiving the tapered alignment pin 477 for aligning the cutter blade 470 with the flange 398 of the body portion 350. Also included are two smaller holes 514 and 516, slightly oversized, for receiving corresponding fasteners for connecting the cutter head 470 to the flange 398. The flange 398 includes a corresponding alignment hole 512a for receiving the pin 477, and two corresponding threaded holes 514a, 516a for threadedly receiving the fasteners. Thus, the precisely located and machined alignment holes 512, 512a can set the precise position of the cutter head 470 with respect to the body portion 350 and the oversized holes 514, 516 cab accommodate relative adjustment between the head 470 and the body portion 350.

Figure 11:
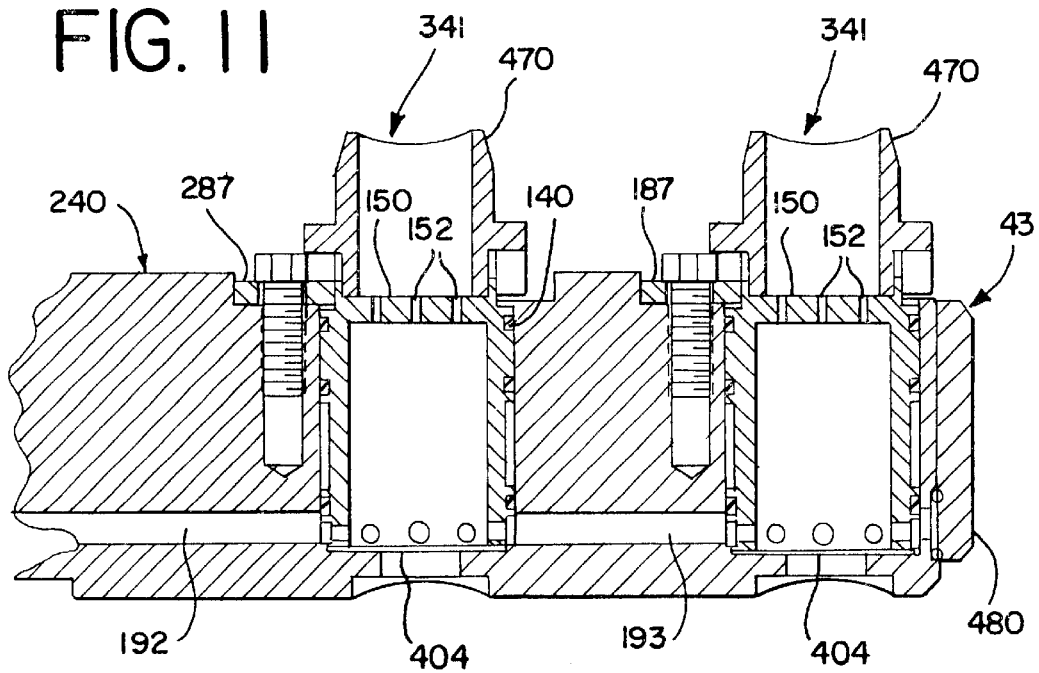
FIG. 11 is a sectional view of an alternate cutter shaft carrying plural cutter assemblies.

FIG. 11 illustrates an alternate shaft 640 which holds plural cutter assemblies 341. The air channel 192 is shown as continuing past the first cutter assembly 341 via an extension channel 193 to deliver air to a second cutter assembly 341. Alternatively, controlled, separate air channels from the manifold block 38 to each cutter assembly could be used to deliver air to the plural cutter assemblies for more accurate sequentially timed control of individual cutter assemblies. Although two cutter assemblies 341 are shown, other numbers of cutter assemblies, such as four in series, or diametrically opposing banks of four cutter assemblies in series, are encompassed by the invention.

The plural cutter assemblies are advantageously associated with plural nozzles 60, one located at each cutter assembly. Pending patent application U.S. Ser. No. 09/444,814, filed Nov. 22, 1999, filed on the same day as the present application, and identified by attorney docket number HCI0467P0470US, and herein incorporated by reference, describes a molten plastic cutting and delivery system using four cutters in a bank, or two diametrically opposing banks of four cutters each, which face four molten plastic delivery nozzles for delivering four pellets to successive blocks of four molding cavities. The blocks are successively presented to the cutters by a rotating carousel.

For the shaft 640 having plural cutter assemblies 341, the cooling fluid channels would also be extended to and from each sequential cutter assembly 341 in a same fashion as the air channel 192 is extended by the extension channel 193.

Figure 12:
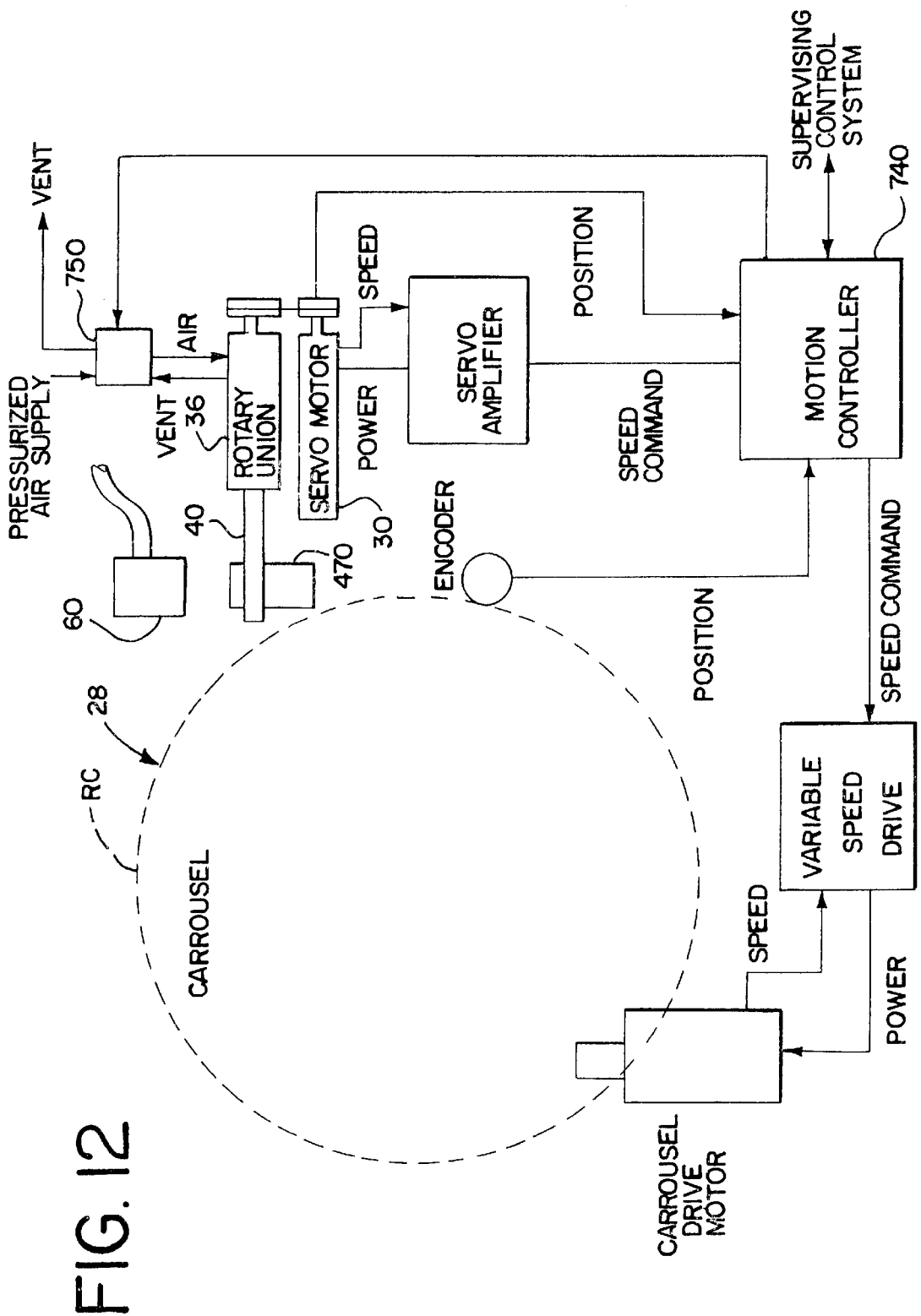
FIG. 12 is a schematic diagram of one embodiment of the operational controls of the present invention.

FIG. 12 illustrates in schematic fashion the operation of the single cutter of the present invention. Particularly, the precision servo motor 30 is controlled by a controller 740 for precise synchronized positioning of the cutter blade or head 74, 470 with the cavities in the carousel. A programmable logic controller (PLC) is used to control this position. U.S. Pat. 5,596,251, herein incorporated by reference, describes a control system for synchronizing a cutter with associated mold cavities on a carousel.

The rotary cutter blade or head 74, 470 sweeps by the extrusion nozzle and cuts and removes a pellet of molten plastic. At a short time thereafter as the cutter approaches the respective cavity, arranged below, the controller 740 acts on a high speed solenoid valve 750 to admit a burst of air into the manifold block 38. Air is thereby injected into the cutter body through the passages of the rotary union and the shaft as previously described.

According to the first described embodiment, the air acts to extend the plunger to eject the pellet with some amount of air being passed through the perforated plate 251 to impinge upon the molten plastic pellet to help displace the pellet from the cutter blade 74 and into the respective cavity. After the pellet is ejected, the controller switches the solenoid valve 750 to vent through the passages which were used previously to extend the plunger, and pressurized air is injected into a different port of the manifold block which directs the air through the rotary union and the shaft to an upper side of the plunger to force the plunger into a retracted position. During plunger extension to eject a pellet, this other port of the manifold block is vented.

According to the second described embodiment, the air is directed through the perforated plate 380 to impinge on the plastic pellet to displace the pellet from the cutter blade 472 and into the respective cavity.

Compared to the arrangement in prior art U.S. Pat. No. 4,277,431, no flexible blade is needed to "fling" or eject the plastic pellet from the blade into the cavity. Accordingly, cutter blade 74 is substantially rigid and non-flexible, and preferably configured to move relative to the associated nozzle without any interfering engagement therewith. And unlike the device disclosed in U.S. Pat. No. 5,596,251 no electronically created deceleration of the cutter is required for pellet ejection.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A rotary cutter for separating a molten plastic pellet from a delivery nozzle and depositing the molten plastic pellet into a mold cavity, comprising:
    a cutter blade;
    a cutter shaft rotatable about an axis of said cutter shaft, said cutter blade mounted to extend radially from said cutter shaft adjacent to an end of said cutter shaft, said cutter shaft positionable adjacent to a delivery nozzle such that the rotary path of an outside edge of said cutter blade closely conforms to a facing surface of said nozzle;
    an air conduit extending through said cutter shaft to said cutter blade, and an air orifice in flow communication with said air conduit and oriented to direct a stream of air radially along said cutter blade to displace a molten plastic pellet from said cutter blade with a stream of pressurized air; and
    a rotary union block surrounding said cutter shaft, said rotary union block having a first channel in registry with a second channel formed into an outside surface of said cutter shaft, said second channel of said cutter shaft flow connected to said air conduit, and the first channel of said union block flow connected to a source of pressurized air.

2. The rotary cutter according to claim 1, further comprising a manifold block connected to said rotary union block, said manifold block having passages in flow communication with said first channel of said rotary union block and said manifold block having a connection for a source of pressurized air.

3. A rotary cutter for separating a molten plastic pellet from a molten plastic delivery nozzle, and depositing the molten plastic pellet into a mold of a mold cavity, comprising:
    a cutter blade;
    a cutter shaft rotatable about an axis of said cutter shaft, said cutter blade mounted to extend radially from said cutter shaft, said cutter shaft positionable adjacent to an extrusion nozzle such that the rotary path of a distal end of said cutter blade sweeps adjacent to said nozzle;
    an air pathway having a supply and open to a source of pressurized air and a delivery end arranged to deliver pressurized air toward said cutter blade to displace a pellet from said blade,
    wherein said air pathway is formed in part by an axial channel through said shaft, at a radial channel through said shaft toward said cutter blade,
    wherein said cutter blade has a base which is mounted to a cutter body, and said shaft has a radial bore which receives said cutter body therein, and said air pathway extends through said cutter body to a perforated plate of said cutter body, said perforated plate adjacent to said base end of said cutter blade, facing a pellet held on said blade,
    and a cooling fluid pathway which includes an annular path between said cutter body and an inside surface of said radial bore, and an axial pathway within said cutter shaft.

4. A rotary cutter for separating a molten plastic pellet from a molten plastic delivery nozzle, and depositing the molten plastic pellet into a mold of a mold cavity, comprising:
    a cutter blade;
    a cutter shaft rotatable about an axis of said cutter shaft, said cutter blade mounted to extend radially from said cutter shaft, said cutter shaft positionable adjacent to an extrusion nozzle such that the rotary path of a distal end of said cutter blade sweeps adjacent to said nozzle;
    an air pathway having a supply and open to a source of pressurized air and a delivery end arranged to deliver pressurized air toward said cutter blade to displace a pellet from said blade; and
    a rotary union block surrounding said cutter shaft, said rotary union block having arcuate channels in registry with arcuate channels formed along a length of said cutter shaft, one of said arcuate channels of said cutter shaft connected to said air conduit and the respective associated arcuate channel of said union block connected to a source of pressurized air, and two other of said arcuate channels of said cutter shaft and associated arcuate channels of said rotary union connected to an incoming and an outgoing source of cooling fluid, and said two other channels of said cutter shaft are in communication with two axial channels extending along said shaft to an area adjacent said cutter blade.

5. The rotary cutter according to claim 4, further comprising a manifold block connected to said rotary union block, said manifold block having passages in flow communication with said arcuate channels of said rotary union block and said manifold block having connections for sources of pressurized air and cooling fluid.

* * * * *